July 18, 1950            L. B. LEE            2,515,412

PRINTING AND WEIGHING APPARATUS

Filed Nov. 23, 1944            3 Sheets-Sheet 1

Inventor
Louis B. Lee

July 18, 1950 L. B. LEE 2,515,412
PRINTING AND WEIGHING APPARATUS
Filed Nov. 23, 1944 3 Sheets-Sheet 2

Inventor
LOUIS B. LEE

July 18, 1950          L. B. LEE          2,515,412

PRINTING AND WEIGHING APPARATUS

Filed Nov. 23, 1944          3 Sheets-Sheet 3

Inventor
Louis B. Lee

UNITED STATES PATENT OFFICE 2,515,412

PRINTING AND WEIGHING APPARATUS

Louis B. Lee, Chicago, Ill.

Application November 23, 1944, Serial No. 564,850

13 Claims. (Cl. 101—35)

My invention relates to a printing apparatus and to an improved structure for arresting rotational operation of a rotatable wheel, and although not limited thereto, my improved printing arrangement has particular application to an automatic weighing apparatus.

It is a general object of my invention to provide an improved automatic apparatus for weighing objects and for printing the weight of the objects thereon.

It is a further object of my invention to provide an improved arrangement for successively weighing a plurality of packages and stamping the weight on the packages.

It is a still further object of my invention to provide an improved arrangement for successively weighing a plurality of objects.

It is a still further object of my invention to provide an improved automatic printing apparatus for arresting a movable member having a plurality of figures thereon so that a predetermined figure will be available in a predetermined position.

It is a still further object of my invention to provide an improved arrangement for arresting relatively rapidly the rotation of a rotating body.

It is a still further object of my invention to obtain an indication of a measured condition and then produce an indication of this measured condition at a remote point.

Further objects and advantages of my invention will become apparent from the following description referring to the accompanying drawings, and the features of novelty which characterize my invention will be pointed out with particularity in the claims annexed to and forming a part of this specification.

In the drawings, I have illustrated my improved printing apparatus as applied to an automatic printing and weighing apparatus, but it will be understood that my printing apparatus may be employed with any other suitable device so as to give an indication of a suitable function or a measured condition. The arrangements illustrated in the drawings include a suitable conveyor with a plurality of scales upon which packages may be placed, the weight of which it is desired to be determined and printed on the packages. During the time the scale is coming to rest or reaching its place of balance, the scale will be moved around until the pointer of the scales comes in contact with one of a group of contacts which control the operation of my printing apparatus. The printing apparatus includes a movable member such as a rotatable wheel on the outer periphery of which is placed suitable characters or figures and in the illustrated application numbers would be placed on the outer periphery of the wheel corresponding to the range of weight of the packages being weighed. The rotatable wheel includes a conducting ring member with an outwardly extending finger, the finger being adapted to cooperate with a plurality of contacts which are spaced around a circle. These contacts are in turn connected with the contact which cooperates with the movable pointer of the scale and a second contact is placed to cooperate with the ring of the rotatable wheel. A suitable control circuit will include the pointer, and the contacts with which it is cooperating at a particular moment and when the rotatable wheel rotates until the finger touches the particular contact connected with the contact which is being touched by the pointer at the particular moment, a wheel arresting arrangement will be operated to relatively rapidly arrest rotation of the wheel. The group of contacts which cooperates with the conducting finger on the rotatable wheel is so positioned with respect to the figures or numbers on the periphery of the wheel that the wheel will be stopped so that the proper number is positioned so that upon bodily movement of the printer the proper number will contact the particular package thus printing the proper weight on the package. It will be understood that in this manner different packages may be successively weighed and the weight thereof printed on the package.

Figure 1:
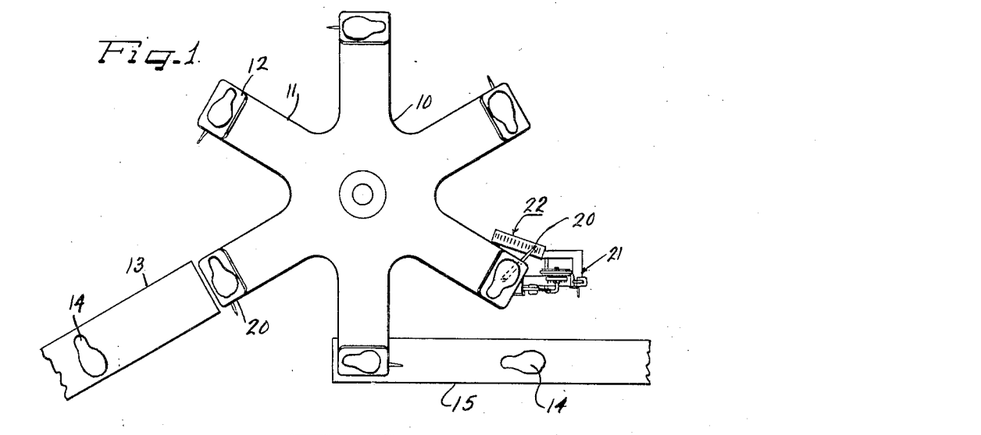
Figure 1 illustrates somewhat diagrammatically an automatic weighing arrangement which is provided with an embodiment of my invention.

Referring to Figure 1 of the drawings, I have illustrated a weighing apparatus including a suitable turret mechanism 10 which may take any suitable form and in the construction illustrated in Figure 1, it includes a member having a plurality of outwardly extending bars 11 on the ends of which are placed weighing scales 12. A conveyor 13 is suitably positioned adjacent the periphery of the turret 10 so that packages 14 which it is desired to be weighed may be delivered to the scales as an empty scale is positioned adjacent the end of the conveyor 13. It will be understood that a second conveyor mechanism 15 may be provided suitably positioned adjacent the outer periphery of the turret for receiving the packages 14 from the scales after they have been suitably weighed and the proper weight has been marked on the package. The turret 10 may be operated in any suitable manner such as being mounted on a spindle 16 which spindle is rotated through a disk wheel 17 mounted thereon which in turn cooperates with a pinion wheel 18 connected to a shaft 19. It will be understood that the shaft 19 may be rotated from any suitable source of power (not shown).

It will be understood that after a first package 14 is delivered to an adjacent empty scale 12 for a short length of time after the package is delivered onto the scale, the scale will oscillate thus causing a pointer 20 thereof to oscillate until it comes to rest thus giving an indication of the weight of the package on the scale at that particular moment. In order, therefore, to insure that the scales have come to rest and the pointer is stationary with respect to the scales, my improved printing apparatus which is indicated generally by the numeral 21 in Figure 1 is positioned so that the turret must travel at least a portion of a complete revolution before the package 14 which has been deposited on a particular scale is in position adjacent the printing device 21 to have the weight of the package on the adjacent scale printed with its weight.

In order to control the operation of the printing device 21 which will be described below, I provide a group of spaced contacts indicated generally by the numeral 22 which are positioned relative to each other around the arc of a circle which is approximately the same arc of travel of the pointer 20 of the weighing machine. It will also be understood after the description of my printing device that there is a particular contact in the group 22 corresponding to each of the numerals or figures which are provided on the outer periphery of the printing device. It will be understood that any suitable number of contacts may be provided depending upon the range of numbers which it is desired to be printed on the package being weighed.

Figure 4:
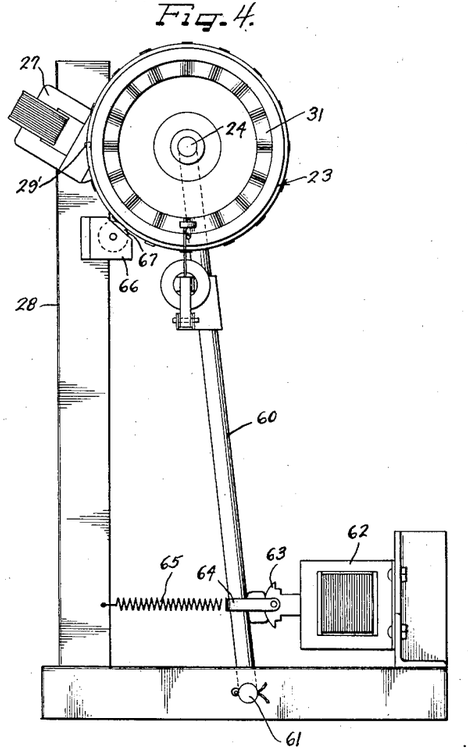
Figure 4 is a side view of my improved automatic printing apparatus which is used in the weighing apparatus of Figures 1 and 2.
Figure 5:
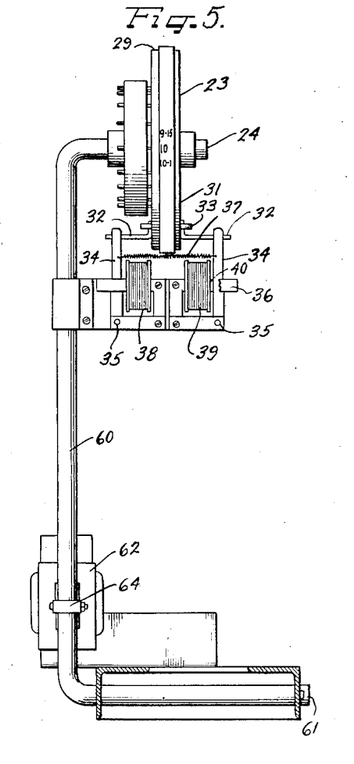
Figure 5 is an end view of the apparatus of Figure 4.

My improved printing apparatus as will be illustrated more particularly in Figures 4 and 5 includes any suitable type of movable member 23 and in the arrangement illustrated in the drawings, the movable member is a wheel or disk which is mounted for rotational movement on a shaft 24. In order to have a minimum amount of friction between the shaft and the rotatable wheel 23, a suitable bearing 25 may be provided between the wheel and the shaft 24. A sleeve 26 is provided adjacent one surface of the wheel so as to prevent the wheel from having axial movement along the shaft 24. The wheel may be rotated in any suitable manner and in the construction illustrated in the drawings, the wheel is rotated through an electric motor 27 which is mounted on a suitable stand 28 adjacent the outer periphery of the wheel 23. The outer periphery of the wheel 23 is provided with a shoulder 29 upon which a shaft 29' of the motor 27 bears so that upon energization of the motor 27, the wheel 23 will be rotated by the frictional engagement between the rotating shaft 29' and the shoulder 29 of the wheel.

In order that the printing apparatus may print the result of the measured condition such as the weight of the particular object 14 being weighed, the outer periphery of the wheel is provided with a plurality of numbers or figures 30. These figures may be of any suitable type depending upon the condition which is being measured and in the construction illustrated in the drawings, it will be seen that the figures are in the form of numbers and in Figure 5 it will be seen that the numbers are ten pounds, nine pounds fifteen ounces and ten pounds one ounce. When weighing a plurality of objects 14 the weights of which will run within a predetermined range, suitable figures are provided on the outer periphery of the wheel 23 corresponding to the weights within the range which it is expected the objects 14 will run.

Figure 6:
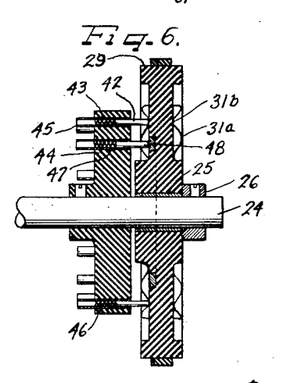
Figure 6 is a sectional side elevation of a portion of the printing apparatus of Figures 4 and 5.
Figure 7:
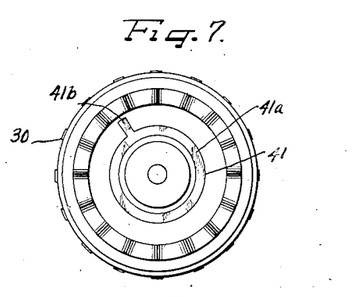
Figure 7 is an end view of the rotatable member of Figure 6 looking at the left-hand face of the rotatable member of Figure 6.

In order to provide a suitable arrangement for arresting the rotational movement of the rotating wheel 23 at predetermined positions, I provide similar tracks 31 on the opposite radial extending edges of the wheel 23. It will be understood that the tracks 31 may take any suitable shape and in the construction illustrated in the drawings, they have approximately a sinusoidal shape with hills 31a and valleys 31b as will be seen particularly in Figure 6. Cooperating with these tracks 31, I provide track following members 32 which have at their outer ends ball bearings 33 which follow the hills and valleys of the tracks as the wheel 23 is rotated. Any suitable type of follower may be provided and a ball bearing construction 33 is an efficient arrangement since a minimum amount of friction will be presented with this type of construction. The ends of the bars 32 are supported in cantilever fashion by members 34 which are pivotally mounted at the opposite ends in bearings 35. Guide members 36 are placed on either side of the pivotally mounted bars 34 so as to maintain their oscillatory movement in a predetermined path. During a portion of the cycle of operation of the weighing cycle the bars 34 will merely oscillate back and forth an amount equal to the depth between the bottom of the valleys 31b and the top of the hills 31a. In order to bias the ends of the rods 32 toward the tracks 31, the opposite bars 34 may be connected together by a suitable spring 37.

In order to provide a force to cause the ends of the rod 32 to be held tightly adjacent the valleys 31b of the tracks 31 at a particular instant in the cycle of printing and weighing, solenoids 38 and 39 are provided with windings which surround a core leg 40. It will be understood that upon energization of the windings of the solenoids a flux will circulate around the rectangular core which includes the movable rods 34 and thus cause the rods 34 to be tightly held against the end 40 of the winding legs of the core. It will be understood that by designing the size of the solenoids 38 and 39 with respect to the contour of the tracks 31 and the rotational inertia developed by the rotation of the wheel 23, upon energization of the solenoids, the wheel 23 may be made to arrest its operation substantially instantly.

In order to provide a suitable control circuit for arresting the rotational movement of the printer wheel 23 so that the desirable figure will be positioned to print a facsimile thereof on the package 14 on the adjacent scale, I provide a suitable conducting member 41 on one of the radially extending faces of the wheel. The conducting member may take any suitable shape and in the construction illustrated in the drawings, it has a first portion or ring portion 41a and a radially extending bar portion 41b. Placed around the circumference of the circle having a radius approximately equal to that from the center of the shaft 24 to the central portion of the bar 41b, I provide a plurality of spaced contact members 42. The contacts 42 may be supported in any suitable manner such as by placing them for limited movement in bores 43 of a disk 44. The outer ends of the bores 43 are closed by conducting members 45 and biasing springs 46 and provided between the ends of the members 45 and the contacts 42. In this manner all the contacts 42 will be biased against the adjacent surface of the disk 23 so that as it rotates the conducting bar 41b will successively contact each of the contacts 42 as it makes one complete revolution. This may be seen in the diagrammatic representation in Figure 3 where the various contacts 42 are placed around a circle having a radius R so that as the bar 41b makes a complete revolution, it will contact successively each of the contacts 42. The disk 44 is also provided with a single bore 47 for containing a contact 48 which is a distance r from the center of the shaft 24. It will be seen that the distance r is the same as the radius of the ring 41 so that the contact 48 will continuously be in contact with the ring 41a.

Figure 3:
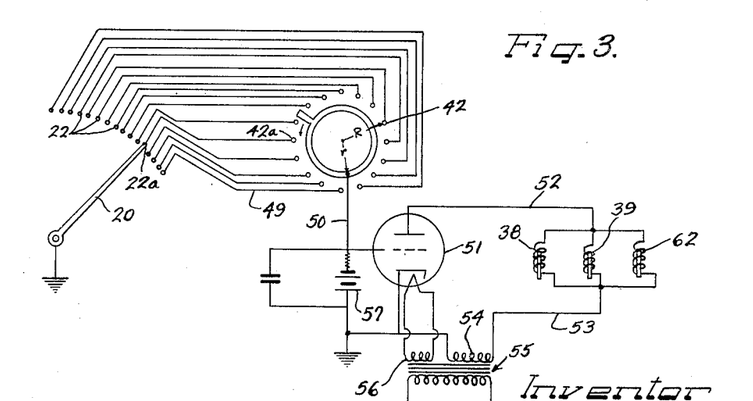
Figure 3 is a diagram of the electrical circuit of my improved automatic weighing and printing apparatus.

In order to connect the various contacts into a suitable control circuit, it will be seen from the diagram of Figure 3 that each of the contacts 42 is connected to a corresponding contact 22 through conductors 49. It will be recalled from the description above that the various contacts 22 are the contacts which are selectively contacted by the pointer 20 of the weighing machine depending upon the weight of the particular objects being weighed. The contact 48 which rides on the ring 41a is connected to a suitable control circuit through a conductor 50. This control circuit may be of any suitable type which will relatively quickly operate the coils of solenoids 38 and 39. This is accomplished through a control circuit including a conventional grid controlled electron tube 51 having the plate connected to one side of the coils of the solenoids 38 and 39 through a conductor 52, the other sides of the coils of the solenoids 38 and 39 being connected to the cathodes of the tube 51 through a conductor 53 and the secondary windings 54 of a power transformer 55. The transformer may also include a heater secondary 56 which is connected to the heater of the electron tube. It will therefore be understood that when the grid of the electron tube is made sufficiently positive, the tube will fire or be rendered conductive and pass current through the coils of the solenoids 38 and 39 thus causing the rotating wheel 23 to be arrested or braked. As will be illustrated in Figure 3, the grid is controlled through a circuit including the conductor 50 which is connected to the grid and to ground through a suitable battery 57. The opposite sides of the pointer 20 and the battery may be grounded and therefore when the pointer 20 contacts a predetermined one of the contacts 22 depending upon the weight of the package being weighed at that particular instant, and when the rotating finger 41b contacts the corresponding one of the contacts 42, current will flow in the grid controlled circuit thus causing the tube to fire.

Operation of my improved weighing and printing arrangement may therefore be summarized as follows: After a particular package 14 has been introduced upon the turret 10 from the conveyor 13 and the turret 10 has been stepped around until that particular package is adjacent the printer 21, the pointer 20 will have stopped oscillating so as the pointer rides over the spaced contacts 22, it will contact only one of them. The particular contact being contacted by the pointer 20 in Figure 3 is identified by the numeral 22a. Let us assume also that the wheel 23 is rotating in a counterclockwise direction and as soon as the finger 41b contacts the particular contact 42a which is connected to the contact 22a, a circuit will be completed from ground through the pointer 20 to the contact 22a, through the particular wire 49 to the contact 42a and then through the finger 41b and ring 41a to the contact 48. The circuit may then be traced through the conductor 50 to the grid controlled circuit and to ground. This will cause a current to flow making the grid less negative and therefore cause the tube to fire. Upon operation of the tube, the solenoids 38 and 39 will be energized, thus arresting or stopping the rotation of the wheel 23 and assuming that the fingers have been suitably positioned on the outer periphery of the wheel, the proper number will be positioned for printing. Let us assume that this number is ten pounds.

In order to print a facsimile of the number ten pounds on the package, relative movement is caused between the package and the printing mechanism and in the construction illustrated in the drawings, the printing mechanism is bodily moved as the shaft 24 is integrally connected to a rod 60 which is pivotally mounted at one end in the bearing 61. The rod 60 and the printing wheel on one end thereof is caused to oscillate toward the package on the adjacent scale through a solenoid 62 which has an operating member 63 connected to the rod 60 through a strap connection 64. It will be seen from the diagram in Figure 3 that the operating coil of the solenoid 62 is connected in parallel with the operating coils of the solenoids 38 and 39 so that all three solenoids are operated simultaneously. This will cause the wheel 23 to stop rotating as has been described above and also cause bodily movement of the printer wheel toward the package so that a facsimile of the number ten which has been properly positioned will imprint itself upon the package thus indicating on the package that that particular article weighs ten pounds. A suitable spring 65 is provided for retracting the rod 60 into its position so that the shoulder 29 will again be in position to be contacted by the shaft 29' of the motor 27 to again cause rotation of the wheel 23.

Any suitable arrangement may be provided so as to prevent the tube to fire again to cause the printing wheel 23 to be again oscillated toward the same package after it has printed the proper number thereon. Thus, a suitable time delay arrangement may be provided in the electron tube circuit or we may assume that by this time the turret 10 has again been caused to rotate so that the pointer 20 drops out of engagement with the particular contact 22a with which it had been in engagement in order to complete the circuit to cause the wheel 23 to be arrested.

Any suitable arrangement may be employed for inking the various numbers on the outer periphery of the wheel and in Figure 4 it will be noted that an ink pot 66 having a roller 67 is positioned so as to maintain a suitable writing fluid on the raised numbers 30 on the outer periphery of the wheel 23.

Figures 8, 9, 10, 11:
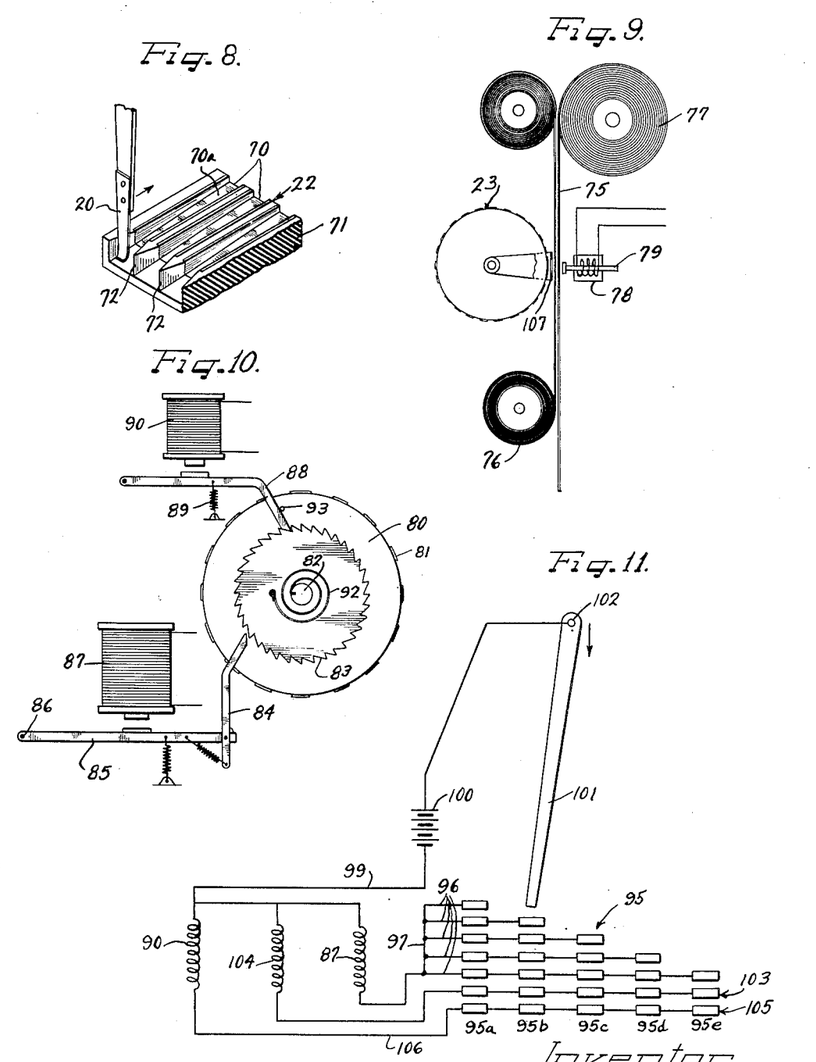
Figure 8 is an isometric view of the contact dial arrangement employed in the system of Figure 1.
Figure 9 illustrates a modification of the apparatus of Figures 1 to 7.
Figure 10 illustrates a modified form of moving the movable member of my improved printing apparatus.
Figure 11 illustrates somewhat diagrammatically a contact segment and wiring diagram for use with the structure of Figure 10.

Referring to Figure 8, I have illustrated the structure of the group of contacts 22 which cooperate with the pointer 20, and it will be understood that the group of contacts may be so constructed that their contacting surfaces will be generally parallel with the plane of movement of the movable pointer 20 as it is rotated around the shaft 16. It will be seen that the contacts include a plurality of channel-shaped conducting members 70 which are embedded in a suitable insulating block 71. In order to insure that the movable pointer 20 will be guided into one of the contact troughs 70 during its movement, the forward ends of the contact members 70 are provided with insulating pointer portions 72. It will therefore be seen that if the pointer contacts one of the pointed portions 72, it will be guided into one of the trough-shaped contacts 70. It will also be seen from an inspection of Figure 8 that the trough-shaped members 70 have contacting surfaces 70a which are inclined slightly from the plane of the path of movement of the pointer 20, or, in other words, the trough-shaped members 70 will be deeper at the forward ends adjacent the points 72 than they will be adjacent the rear ends. The purpose of this construction is that if the pointer 20 is positioned between the sides of the trough-shaped members 70 and the end of the pointer 20 is slightly bent, since the surfaces 70a are inclined slightly with respect to the path of movement of the pointer 20, the pointer will contact the surfaces 70a at some point during its travel through the trough-shaped members 70.

It will be understood that any suitable construction may be provided for causing relative movement between the printer wheel 23 and the object upon which a facsimile is to be printed, and in Figure 9, I have illustrated a modification of the construction illustrated in Figures 1 through 7 in which the object upon which it is desired to be printed is a tape 75 which is unwound from a reel (not shown) and wound on a reel 77. A tape of carbon may be provided which is unwound from a reel 76. It will be understood that in the construction illustrated in Figure 9, suitable arrangements are provided for operating the printer wheel 23 until the desired figure is adjacent the tape 75 depending upon the object or condition which is being measured. This condition or function which is being measured may be the weight of packages which are provided on a turret as is illustrated in Figure 1 or may be any other suitable function such as an equivalent number which is on a recording device remote from the printer 23. It will also be seen that an electromagnet 78 is provided having a movable armature 79 so that when the solenoid 78 is operated, the adjacent portion of the tape 75 will be pushed against the proper number through the movement of the armature member 79. It will be understood that the solenoid 78 may be operated in a circuit similar to that which operates the solenoid 62 in Figure 3 for causing relative movement between the printing wheel and the object upon which the facsimile is printed.

It will be understood that the printing wheel may be moved in any suitable manner, and in Figure 10 I have illustrated an arrangement for stepping a printing wheel around to a predetermined position depending upon the measurement of a function the recording of which is desired such as through a printing of the facsimile of a function on a suitable object. Referring to Figure 10, I have illustrated a wheel 80 upon which is provided a plurality of figures 81, the wheel 80 being adapted for movement around an axis or shaft 82. Attached to the wheel 80 is a ratchet wheel 83 which is adapted to be moved in a stepped manner through a pawl operating member 84. The pawl 84 may be in turn operated in any suitable manner such as through an operating lever 85 which is pivoted at 86 and which is operated when a selector solenoid 87 is energized. A second pawl member 88 is provided which is biased toward the ratchet wheel 83 through a spring 89, and the pawl member 88 may be moved out of engagement with the wheel 83 when a homing magnet coil 90 is energized. In order to operate the printing wheel 80 back to a predetermined or homing position after it has been moved to a predetermined position through the energization of the selector magnet coil 87, I provide a spring member 92 which is wound up each time the selector magnet 87 is energized and upon energizing of the homing magnet coil 80, the pawl 88 will be moved out of engagement with the ratchet wheel 83 thus allowing the spring to return the printing wheel 80 to a predetermined or homing position at which time a suitable stop 93 will contact the pawl 88.

Figure 2:
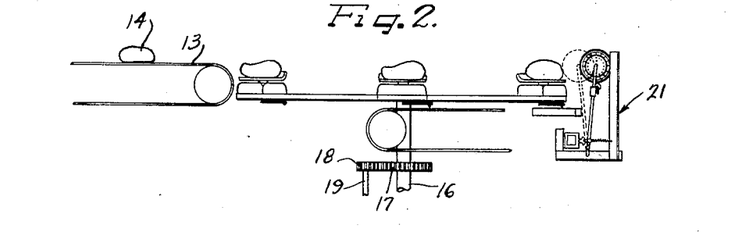
Figure 2 is a side view of the apparatus of Figure 1.

In order to operate the selector magnet coil 87 and the homing magnet coil 90, I provide a plurality of groups of contacts which are indicated generally by the numeral 95 in Figure 11. When my improved printing apparatus is employed as an automatic weighing and printing apparatus, the plurality of groups of contacts indicated by the numeral 95 in Figure 11 will take the place of the contacts 22 as is illustrated in Figures 1 and 2. It will be seen that the plurality of groups of contacts 95 include a plurality of groups 95a, 95b, 95c, 95d, and 95e, and each one of the groups 95a through 95e have a different number of contacts and in the construction illustrated in Figure 11, the group 95a has seven contacts with each of the remaining groups having one less contact than the preceding group. Each of the adjacent contacts of the various groups is connected together by suitable conductors 96 and the various conductors are in turn connected together through a conductor 97 which connects to the operating coil of the selector magnet coil 87. The circuit is continued through a conductor 99, a suitable source of electric potential 100 such as a battery and a suitable pointer mechanism 101 which may, if desired, be similar to the pointer 20. It will be understood that the pointer mechanism 101 may be operated around its pivot point 102 to a predetermined position in an arc depending upon the particular function which is being indicated or measured, and when the pointer 101 is a part of a weighing scale of the type illustrated in Figure 1, the pointer 101 will reach a position depending upon the weight of the object in the scale. Let us assume that the end of the pointer is adjacent the group of contacts 95b. It will then be seen that as the pointer is bodily moved in the direction of the arrow which would be substantially the direction in case the pointer were being bodily moved by rotation of the turret around the shaft 16, the end of the pointer 101 will make contact successively with each of the contacts of the group 95, and as each contact is made, the selector solenoid 87 will be energized to cause the printing wheel 80 to be rotated one step. It will be understood that for each step in its rotation, another number will be suitably positioned adjacent an object upon which a facsimile of the number is to be printed such as an object as is shown in Figure 1 or a tape as is shown in Figure 9. After the pointer 101 has contacted four of the contacts of the group 95b, it will then contact a contact indicated by the numeral 103 which is connected with similar contacts of the other groups in circuit with a solenoid operated coil 104. It will be understood that this solenoid operated coil will cause relative movement between the wheel 80 and the object upon which the facsimile of the adjacent number is printed, and in case it is desired to print on a tape, the coil 104 would be similar to the operating coil of the magnet 78 in Figure 9.

In order to return the printing wheel back to a predetermined or homing position after the printing operation is complete, it will be noted from Figure 11 that each of the groups of contact 95a through 95e is provided with contacts 105. It will be noted that the contacts 105 are connected together through a conductor 106 and to the operating coil of the homing magnet 90, and this coil is also connected through the source of supply 100 and the pointer 101, and upon the pointer contacting the particular contacts 105 of the groups, the pawl 88 will be raised, thus causing the spring 92 which has been wound up due to the inching or stepping movement of the wheel 80 to quickly return the wheel 80 to its homing position or until the stop 93 contacts the pawl 88. The printing wheel will therefore be in its predetermined position so that it can print again whenever the pointer 101 contacts the various contacts of any one of the groups 95a through 95e.

As will be seen in Figure 9, a suitable mask 107 may be provided between the printer 23 and the object on which the number is printed, the mask having a suitable slot to insure that only one number at a time is printed on the tape.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an apparatus for printing the result of a condition at a point spaced from the place of the happening of the condition, a rotatably mounted member, means for rotating said rotatably mounted member during operation of said apparatus, means including a plurality of spaced contacts and a movable contact member cooperable therewith, means positioning said movable contact at a predetermined point in the path of its movement in response to the happening of the particular condition, means for bodily moving said movable contact with respect to said spaced contacts so that said movable contact may cooperate with one of said spaced contacts after said movable contact has been positioned by said positioning means, means for arresting operation of said rotatably mounted member, an electrical control circuit including said plurality of spaced contacts and a second contact member mounted for rotation with said rotatably mounted member so that when said second contact cooperates with the particular spaced contact contacted by said movable contact said control circuit will be energized to operate said arresting means, and means in said rotatably mounted member for printing the particular place in the path of rotation which it has been stopped so as to give a result of said condition being measured.

2. In a weighing and printing apparatus, a plurality of weighing scales adapted to have packages to be weighed placed thereon, means for moving said scales in a predetermined path, each of said scales having a bar member adapted to be positioned in a predetermined position with respect to said scales to give the weight of the package on each scale, a plurality of spaced contacts positioned in the path of movement of said scales so that as each scale passes adjacent said spaced contacts said scale bar will contact a predetermined one of said spaced contacts depending upon the weight of the package in the scales, a rotatably mounted printing member adjacent the path of movement of said scales and having different figures thereon corresponding to the weights of the packages, and means responsive to the contacting of said bar member and a predetermined one of said spaced contacts for positioning said printing member and causing relative movement between said printing member and said package for printing a figure thereon corresponding to the weight of the package as determined by the scales.

3. In a weighing and printing apparatus, a plurality of weighing scales adapted to have packages to be weighed placed thereon, means for moving said scales in a predetermined path, each of said scales having a bar member adapted to be positioned in a predetermined position with respect to said scales to give the weight of the package on each scale, a plurality of spaced contacts positioned in the path of movement of said scales so that as each scale passes adjacent said spaced contacts said scale bar will contact a predetermined one of said spaced contacts depending upon the weight of the package in the scales, a rotatably mounted printing member adjacent the path of movement of said scales and having different figures thereon corresponding to the weights of the packages, means for mounting said printing member for limited movement toward and away from the package on the scale adjacent said printer, and means responsive to the contacting of said bar member and a predetermined one of said spaced contacts for positioning said printing member so that a figure will be facing said scale corresponding to the weight of the package in the adjacent scale, and means for causing movement of said printing member toward said adjacent scale so that said figure will be printed on the package on said adjacent scale.

4. In a weighing and printing apparatus, a plurality of weighing scales adapted to have packages to be weighed placed thereon, means for moving said scales in a predetermined path, each of said scales having a bar member adapted to be positioned in a predetermined position with respect to said scales to give the weight of the package on each scale, a plurality of spaced contacts positioned in the path of movement of said scales so that as each scale passes adjacent said spaced contacts said scale bar will contact a predetermined one of said spaced contacts depending upon the weight of the package in the scales, a printing mechanism adjacent the path of movement of said scales and including a wheel member mounted for rotation during operation of said apparatus, said wheel member having figures adjacent its outer periphery corresponding to the range of weights of the packages being weighed on said scales, a contact mounted for rotation with said wheel member, a second group of spaced stationary contacts placed for cooperation with said rotatable contact, means for connecting said spaced scale contacts with said second group of contacts, and means responsive to a circuit completed by said bar contacting a predetermined one of said spaced scale contacts corresponding with the weight of the package on the adjacent scale and said rotatable contact contacting said one of said contacts of said second group which is connected to said one contact of said first group for arresting rotation of said wheel so that a figure corresponding to the weight of the package on said adjacent scale will be positioned to print said figure on said package.

5. In a weighing and printing apparatus, a plurality of weighing scales adapted to have packages to be weighed placed thereon, means for moving said scales in a predetermined path, each of said scales having a bar member adapted to be positioned in a predetermined position with respect to said scales to give the weight of the package on each scale, a plurality of spaced contacts positioned in the path of movement of said scales so that as each scale passes adjacent said spaced contacts said scale bar will contact a predetermined one of said spaced contacts depending upon the weight of the package in the scales, a printing mechanism adjacent the path of movement of said scales and including a wheel member mounted for rotation during operation of said apparatus, said wheel member having figures adjacent its outer periphery corresponding to the range of weights of the packages being weighed on said scales, a contact mounted for rotation with said wheel member, a second group of spaced stationary contacts placed for cooperation with said rotatable contact, means for connecting said spaced scale contacts with said second group of contacts, and means responsive to a circuit completed by said bar contacting a predetermined one of said spaced scale contacts corresponding with the weight of the package on the adjacent scale and said rotatable contact contacting one of said contacts of said second group which is connected to said one contact of said first group for arresting rotation of said wheel so that a figure corresponding to the weight of the package on said adjacent scale will be positioned to print said figure on said package, and means for causing bodily movement of said printing mechanism to cause said figure to print a facsimile thereof on the package in said scale.

6. In a weighing and printing apparatus, a plurality of weighing scales adapted to have packages to be weighed placed thereon, means for moving said scales in a predetermined path, each of said scales having a bar member adapted to be positioned in a predetermined position with respect to said scales to give the weight of the package on each scale, a plurality of spaced contacts positioned in the path of movement of said scales so that as each scale passes adjacent said spaced contacts said scale bar will contact a predetermined one of said spaced contacts depending upon the weight of the package in the scales, a printing mechanism adjacent the path of movement of said scales and including a wheel member mounted for rotation during operation of said apparatus, said wheel member having figures adjacent its outer periphery corresponding to the range of weights of the packages being weighed on said scales, a contact mounted for rotation with said wheel member, a second group of spaced stationary contacts placed for cooperation with said rotatable contact, means for connecting said spaced scale contacts with said second group of contacts, brake means for relatively rapidly arresting rotational movement of said wheel member including a track on a portion of the radially extending surface of said rotatable disk and a follower cooperable with said track and mounted for reciprocal movement in said track, electromagnetic means for forcing said track follower against said disk in said track for arresting rotational movement of said disk, and means responsive to a circuit completed by said bar contacting a predetermined one of said spaced scale contacts corresponding with the weight of the package on the adjacent scale and said rotatable contact contacting said one of said contacts of said second group which is connected to said one contact of said first group for energizing said electromagnetic means for arresting rotation of said wheel so that a figure corresponding to the weight of the package on said adjacent scale will be positioned to print said figure on said package.

7. In a weighing and printing apparatus, a plurality of weighing scales adapted to have packages to be weighed placed thereon, means for moving said scales in a predetermined path, each of said scales having a bar member adapted to be positioned in a predetermined position with respect to said scales to give the weight of the package on each scale, a plurality of spaced contacts positioned in the path of movement of said scales so that as each scale passes adjacent said spaced contacts said scale bar will contact a predetermined one of said spaced contacts depending upon the weight of the package in the scales, a printing mechanism adjacent the path of movement of said scales and including a wheel member mounted for rotation during operation of said apparatus, said wheel member having figures adjacent its outer periphery corresponding to the range of weights of the packages being weighed on said scales, a contact mounted for rotation with said wheel member, a second group of spaced stationary contacts placed for cooperation with said rotatable contact, means for connecting said spaced scale contacts with said second group of contacts, brake means for relatively rapidly arresting rotational movement of said wheel member including a track on a portion of the radially extending surface of said rotatable disk and a follower cooperable with said track and mounted for reciprocal movement in said track, electromagnetic means for forcing said track follower against said disk in said track for arresting rotational movement of said disk, and means responsive to a circuit completed by said bar contacting a predetermined one of said spaced scale contacts corresponding with the weight of the package on the adjacent scale and said rotatable contact contacting said one of said contacts of said second group which is connected to said one contact of said first group for energizing said electromagnetic means for arresting rotation of said wheel so that a figure corresponding to the weight of the package on said adjacent scale will be positioned to print said figure on said package, and means for causing bodily movement of said printing mechanism to cause said figure to print a facsimile thereof on the package in said scale.

8. In a weighing and printing apparatus, a plurality of weighing scales adapted to have packages to be weighed placed thereon, means for moving said scales in a predetermined path, each of said scales having a bar member adapted to be positioned in a predetermined position with respect to said scales to give the weight of the package on each scale, a plurality of spaced contacts positioned in the path of movement of said scales so that as each scale passes adjacent said spaced contacts said scale bar will contact a predetermined one of said spaced contacts depending upon the weight of the package in the scales, a printing mechanism adjacent the path of movement of said scales and including a wheel member mounted for rotation during operation of said apparatus, said wheel member having figures adjacent its outer periphery corresponding to the range of weights of the packages being weighed on said scales, a contact mounted for rotation with said wheel member, a second group of spaced stationary contacts placed for cooperation with said rotatable contact, means for connecting said spaced scale contacts with said second group of contacts, brake means for relatively rapidly arresting rotational movement of said wheel member including a track on a portion of the radially extending surface of said rotatable disk and a follower cooperable with said track and mounted for reciprocal movement in said track, electromagnetic means for forcing said track follower against said disk in said track for arresting rotational movement of said disk, and means responsive to a circuit completed by said bar contacting a predetermined one of said spaced scale contacts corresponding with the weight of the package on the adjacent scale and said rotatable contact contacting said one of said contacts of said second group which is connected to said one contact of said first group for energizing said electromagnetic means for arresting rotation of said wheel so that a figure corresponding to the weight of the package on said adjacent scale will be positioned to print said figure on said package, and a second electromagnetic means energized at the time said first electromagnetic means is energized for causing movement of said printing wheel toward said adjacent scale to cause said figure to print a facsimile thereof on the package in said scale.

9. In a weighing and printing apparatus, a scale device mounted for movement in a predetermined path, a pointer on said scale and movable in response to the weight of the object in said scale, and a group of contacts positioned in the path of movement of said scale so that said pointer may contact any one of said contacts depending upon the weight of the object in said scale, and means responsive to said pointer contacting the corresponding stationary contact of said group for printing the weight of said object thereon.

10. In a weighing apparatus, a scale device mounted for movement in a predetermined path, a pointer on said scale and oscillatable in a predetermined arc in response to the weight of the object in said scale, a group of contacts positioned in the path of movement of said scale so that said pointer may cooperate with any one of said contacts depending upon the weight of the object in said scale, and means for moving said scale on said path of movement so that after said pointer has come to rest in its path of oscillation only one of said contacts will be contacted during the weighing of one object.

11. In a weighing and printing apparatus, a scale device mounted for movement in a predetermined path, a pointer on said scale and movable in response to the weight of the object in said scale, and a group of contacts positioned in the path of movement of said scale so that said pointer may contact any one of said contacts depending upon the weight of the object in said scale, said group of contacts being positioned with surfaces inclined slightly from a plane parallel with the path of movement of said pointer so as to insure the pointer contacting the surface of the adjacent contact during its movement.

12. In a weighing and printing apparatus including means to receive the printing thereon, a plurality of weighing scales adapted to have packages to be weighed placed thereon, means for moving said scales in a predetermined path, each of said scales having a bar member adapted to be positioned in a predetermined position with respect to said scales to give the weight of the package on each scale, a plurality of spaced contacts positioned in the path of movement of said scales so that as each scale passes adjacent said spaced contacts said scale bar will contact a predetermined one of said spaced contacts depending upon the weight of the package in the scales, the combination with said scales and spaced contacts, of a printing wheel member adjacent the path of movement of said scales mounted for rotation during operation, said wheel member having figures adjacent its outer periphery corresponding to the range of weights of the packages being weighed on said scales, a contact mounted for rotation with said wheel member, a second group of spaced stationary contacts placed for cooperation with said rotatable contact, means for connecting said spaced scale contacts with said second group of contacts, brake means for relatively rapidly arresting rotational movement of said wheel member including a track on a portion of the radially extending surface of said rotatable disk and a follower cooperable with said track and mounted for reciprocal movement in said track, electromagnetic means for forcing said track follower against said disk in said track for arresting rotational movement of said disk, and means responsive to a circuit completed by said bar contacting a predetermined one of said spaced scale contacts corresponding with the weight of the package on the adjacent scale and said rotatable contact contacting said one of said contacts of said second group which is connected to said one contact of said first group for energizing said electromagnetic means for arresting rotation of said wheel so that a figure corresponding to the weight of the package on said adjacent scale will be positioned to print said figure on said means to receive said printing, and a second electromagnetic means energized at the time said first electromagnetic means is energized for causing movement of said wheel toward said means to receive said printing to cause said figure to print a facsimile thereof on said means to receive said printing.

13. In an apparatus for automatically printing the value of a measured condition on a succession of objects, a rotatable turret having spaced portions to receive said objects and including bar members individually operable to move in accord with the value of said condition of the object on one of said spaced portions, means to rotate said turret bodily to move said bar members over a predetermined path, a plurality of spaced contacts positioned in the path of movement of said bar members to cause said bar members successively to pass adjacent said spaced contacts and to contact a predetermined one of said spaced contacts depending on the value of said condition, a movably mounted printing member having different figures thereon corresponding to the values of said condition, and means responsive to the contacting of each of said bar members and a predetermined one of said spaced contacts for positioning said printing member to print a figure and effecting relative movement between said printing member and the object corresponding to the bar member in contact with said spaced contacts to print a figure on said object in accord with the position of said bar member.

LOUIS B. LEE.

REFERENCES CITED

The following references are of record in the file of this patent:

UNITED STATES PATENTS

| Number | Name | Date |
|---|---|---|
| 1,432,794 | Sharron | Oct. 24, 1922 |
| 1,680,326 | Dutton | Aug. 14, 1928 |
| 1,904,784 | Garrity et al. | Apr. 18, 1933 |
| 1,909,724 | Schellentrager | May 16, 1933 |
| 1,914,388 | Von Pein et al. | June 20, 1933 |
| 2,025,801 | Cadden | Dec. 31, 1935 |
| 2,142,252 | Nunan | Jan. 3, 1939 |
| 2,148,861 | Ball | Feb. 28, 1939 |
| 2,302,009 | Dickinson | Nov. 17, 1942 |
| 2,350,454 | Goebel | June 6, 1944 |

FOREIGN PATENTS

| Number | Country | Date |
|---|---|---|
| 687,764 | Germany | Feb. 5, 1940 |